(12) United States Patent
Cisneros et al.

(10) Patent No.: US 8,425,648 B2
(45) Date of Patent: Apr. 23, 2013

(54) SLOW CALCIUM RELEASE FERTILIZER

(76) Inventors: Guillermo J. Cisneros, Othello, WA (US); David E. Horn, West Richland, WA (US); Daniel T. Hazen, Bellevue, WA (US); John B. Marler, Bellevue, WA (US)

( * ) Notice: Subject to any disclaimer, the term of this patent is extended or adjusted under 35 U.S.C. 154(b) by 180 days.

(21) Appl. No.: 13/110,723

(22) Filed: May 18, 2011

(65) Prior Publication Data
US 2011/0283759 A1   Nov. 24, 2011

Related U.S. Application Data

(60) Provisional application No. 61/345,958, filed on May 18, 2010.

(51) Int. Cl.
*C05F 3/00* (2006.01)
(52) U.S. Cl.
USPC .................................................. 71/21; 71/63
(58) Field of Classification Search ................ 71/11–63
See application file for complete search history.

(56) References Cited

U.S. PATENT DOCUMENTS 6,254,654 B1 * 7/2001 Van Barneveld ................ 71/8
2009/0188290 A1 * 7/2009 Marler .............................. 71/21

FOREIGN PATENT DOCUMENTS

| DE | 3703093 | * | 8/1988 |
| DE | 4033509 | * | 4/1992 |
| EP | 486932 | * | 5/1992 |
| JP | 2002-160986 | * | 6/2002 |

* cited by examiner

*Primary Examiner* — Wayne Langel
(74) *Attorney, Agent, or Firm* — Marvin A. Motsenbocker; Mots Law, PLLC

(57) ABSTRACT

Slow calcium release fertilizers and methods for their synthesis are described. Organic materials, particularly from manure are used for coating to achieve slow release forms of the fertilizer. Desirably, low temperature kinetic treatments are used to prepare pulverized forms having small size yet well coated with natural (non-denatured) molecular material to achieve the slow release. A desired embodiment is made from kinetic processing of rock gypsum and manure at low temperatures with added acid. Use of the fertilizers leads to acceleration of microbial viability.

6 Claims, 7 Drawing Sheets

FIG. 2

NUTRIENT COMPOSITION

| 709 | 100% Dry Matter Basis | | As Received Basis | | LBS/TON (As Received) |
|---|---|---|---|---|---|
| pH | | | | | |
| Electrical Conductivity (dS/m) (1:2) | | | | | |
| DRY MATTER | 100.00% | | 84.14% | | 1683 |
| TOTAL KJELDAHL NITROGEN (TKN) | 3.19% | | 2.69% | | 53.7 |
| NITRATE-NITROGEN (NO3N) | | | | | |
| AMMONIA NITROGEN (NH3N) | | | | | |
| TOTAL PHOSPHORUS (P) | 1.42% | | 1.19% | | 23.8 |
| as P2O5 | 3.24% | | 2.73% | | 54.6 |
| 2% acetic acid soluble PO4-P | 1.13% | | 0.95% | | 19.0 |
| as P2O5 | 2.59% | | 2.18% | | 43.6 |
| TOTAL POTASSIUM (K) | 1.67% | | 1.41% | | 28.1 |
| as K2O | 2.01% | | 1.69% | | 33.9 |
| 2% acetic acid soluble Potassium | 1.65% | | 1.38% | | 27.7 |
| as K2O | 1.98% | | 1.67% | | 33.4 |
| TOTAL SULFUR (S) | 7.78% | | 6.55% | | 130.9 |
| 2% acetic acid soluble Sulfur | 4.47% | | 3.76% | | 75.2 |
| TOTAL CALCIUM (Ca) | 15.50% | | 13.04% | | 260.8 |
| 2% acetic acid soluble Calcium | | | | | |
| TOTAL MAGNESIUM (Mg) | 0.61% | | 0.51% | | 10.3 |
| 2% acetic acid soluble Magnesium | | | | | |
| TOTAL SODIUM (Na) | 0.34% | | 0.29% | | 5.7 |
| 2% acetic acid soluble sodium | | | | | |
| ZINC (Zn) | 217 | ppm | 183 | ppm | 0.37 |
| MANGANESE (Mn) | 275 | ppm | 231 | ppm | 0.46 |
| COPPER (Cu) | 172 | ppm | 145 | ppm | 0.29 |
| IRON (Fe) | 1190 | ppm | 1001 | ppm | 2.00 |

FIG. 3a

Dissolution Rates of Various Gypsum Products in Deionized (DI) Water
(As measured by the increase of dissolved calcium over time)

| | Sample ID | Dry Matter % | Amount used (As Received) grams | Volume of DI Water liters | Carboy size (Plastic) liters |
|---|---|---|---|---|---|
| 1 | S-4 Gyp | 84.14% | 6 | 3 | 4 |
| 2 | S-5 Gyp | 73.47% | 6 | 3 | 4 |
| 3 | Dryer Gyp | 80.26% | 6 | 3 | 4 |
| 4 | Cooler Gyp | 89.46% | 6 | 3 | 4 |
| 5 | GA Gyp | 85.26% | 6 | 3 | 4 |
| 6 | CaSO4 8kd (ACS Grade) Anhydrite | 99.42% | 6 | 3 | 4 |

Note: 100% Pure Gypsum ($CaSO_4 \cdot 2H_2O$) is 79.07% Dry Matter, Due to Bonded Water Contained in the Gypsum Crystal Structure All 7 Carboys were placed on an Eberbach shaker and periodically shaken mechanically (150 cycles per minute) for short periods of time (generally 15 to 30 minutes). Approximately 30 ml of each sample was taken each sampling period for Calcium analysis. The total sample volume removed during the test was approximately 8% of the initial volume added to each sample.

FIG. 3b

Dissolved Calcium (Ca) Concentrations over time for various products containing gypsum in aqueous solution

(Calcium Concentration in mg/l)

| TIME (hrs) | 0.0 | 1.3 | 2.5 | 3.5 | 5.5 | 7.5 | 23.0 | 43.0 | 92.5 |
|---|---|---|---|---|---|---|---|---|---|
| 4-Gyp | 0 | 57 | 61 | 72 | 74 | 74 | 81 | 87 | 89 |
| 5-Gyp | 0 | 66 | 76 | 86 | 88 | 86 | 100.2 | 114 | 116.2 |
| Dryer Gyp | 0 | 18 | 32 | 42 | 48 | 57 | 73.8 | 81 | 84.0 |
| Cooler Gyp | 0 | 24 | 42 | 57 | 70 | 86 | 110 | 120 | 130 |
| GA Gyp | 0 | 100 | 226 | 254 | 270 | 282 | 320 | 342 | 360 |
| Std Gyp | 0 | 380 | 426 | 432 | 438 | 437 | 438 | 429 | 432 |

Percent of original material gone into solution

(assuming all dissolved calcium is from dissolved CaSO4)

| TIME (hrs) | 0.0 | 1.3 | 2.5 | 3.5 | 5.5 | 7.5 | 23.0 | 43.0 | 92.5 |
|---|---|---|---|---|---|---|---|---|---|
| 4-Gyp | 0% | 8% | 10% | 12% | 13% | 13% | 14% | 17% | 17% |
| 5-Gyp | 0% | 11% | 16% | 14% | 15% | 18% | 17% | 18% | 20% |
| Dryer Gyp | 0% | 3% | 6% | 7% | 8% | 10% | 13% | 14% | 14% |
| Cooler Gyp | 0% | 6% | 7% | 10% | 13% | 15% | 19% | 26% | 26% |
| GA Gyp | 0% | 32% | 38% | 45% | 47% | 80% | 84% | 85% | 85% |
| Std Gyp | 0% | 90% | 97% | 98% | 100% | 100% | 100% | 98% | 98% |

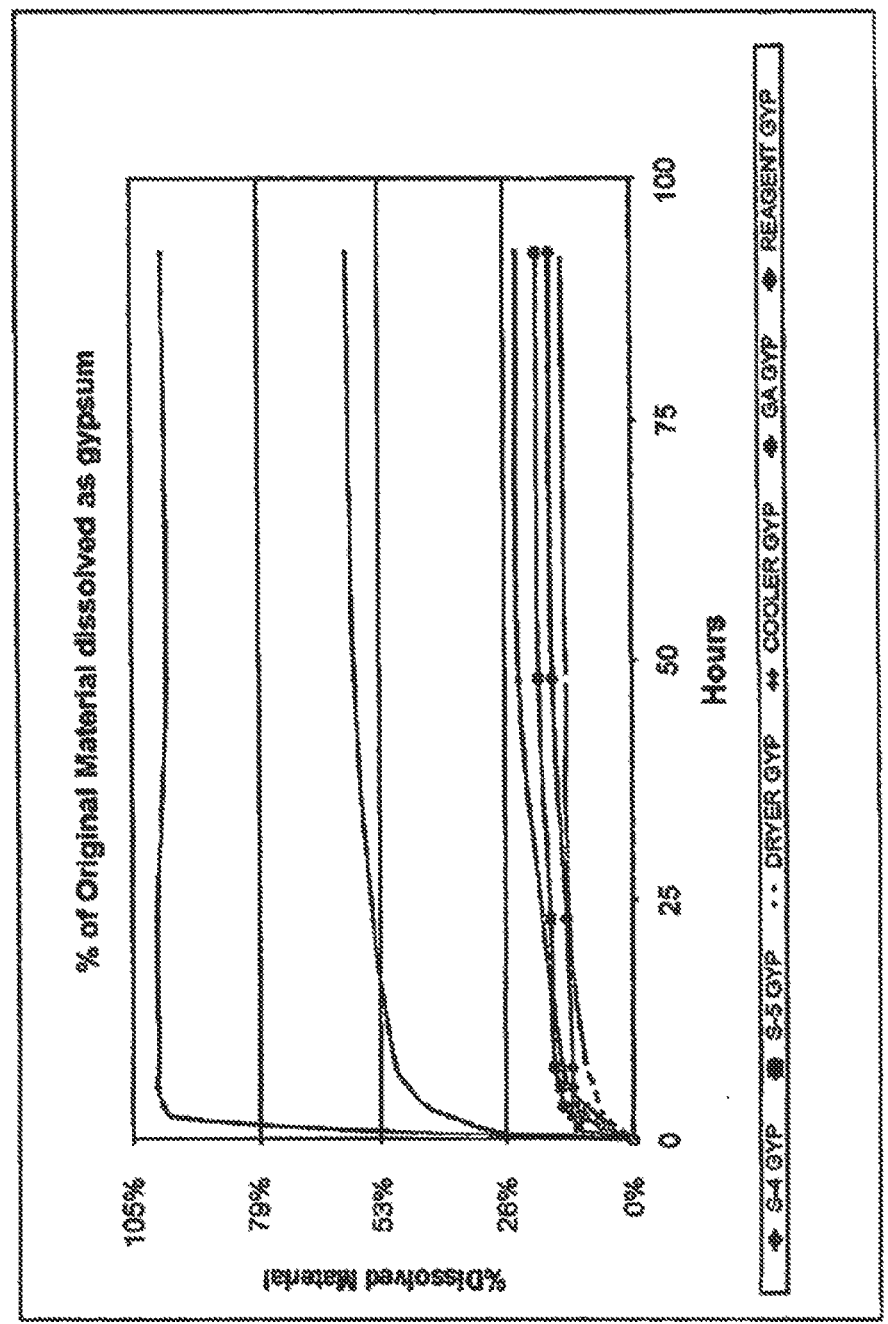

US 8,425,648 B2

SLOW CALCIUM RELEASE FERTILIZER

CROSS REFERENCE TO RELATED APPLICATIONS

This receives priority from U.S. No. 61/345,958 entitled "Gypsum Fertilizer with Useful Solubility Characteristics" filed May 18, 2010 by Cisneros et al., the entire contents of which are incorporated herein by reference.

FIELD OF THE INVENTION

The invention relates to fertilizers, and more particularly to fertilizers that supply calcium.

BACKGROUND

Fertilizer technology is as old as human civilization and often utilizes fecal matter from animal husbandry. However, due to greater understanding of plant physiology, empirical results leading to improved practices, and better equipment, this field continuously advances.

A very interesting discovery has been that calcium added as a plant nutrient benefits postharvest storage, via a change in physiology of many plants such as pome fruit, potatoes and some green vegetables. See for example "The Role of Calcium and Nitrogen in Postharvest Quality and Disease Resistance of Apples" (Fallahi et al, HortScience, Vol. 32(5), August 1997). As a result, some basic science has focused on direct calcium feeding by adding a readily absorbable source such as calcium chloride and calcium nitrate as exemplified by Cihacek et al from North Dakota State University "Effects of Calcium and Nitrogen Fertilizer Application on Carrot Root Yield and Storage Quality" (www.ag.ndsu.nodak.edu/oakes/1999Report/crfrt99.htm).

Companies involved in mineral extraction, use and recycling have discovered that minerals such as lime and gypsum can be used as soil supplements, primarily to improve the physical characteristics of the soil.

For example, USA Gypsum exhorts the advantages of Gypsum added and directly mixed into soil to prevent soil compaction (www.usagypsum.conm/agricultural-gypsum.aspx).

One problem of fertilizer application is how to apply (high energy to mixing into the soil vs. lower energy scatter on top of soil, spray onto leaves, etc. Another is the occasional need for slow, long term release, to prevent wastage via quick runoff of high soluble plant nutrients. Accordingly, any form of fertilizer that provides a more convenient application method, or control of dissolution, would be an important tool in the farmer's arsenal for controllable delivery of plant nutrients such as calcium and sulfur, where and when needed. In some cases, application of a mineral such as gypsum requires an expensive screening step and use of a non-nutritive or expensive binder such as clay, lignin or starch as, for example, described by Steele et al in U.S. No. 2001/0029762A1 "Soil Amendment Product and Process." In contrast, it would be most desirable to both control dissolution of soluble minerals via packaging of the mineral with a desirable fertilizer component. Such low cost, controlled solution also would benefit the farmer.

SUMMARY OF THE INVENTION

Embodiments address the limitations cited above by providing high calcium fertilizers and methods for their construction and use for controllable application in agriculture.

In one embodiment, a slow release calcium containing-fertilizer is provided that comprises calcium mineral particles coated with organic material wherein the calcium mineral to organic material ratio is between 20:80 and 80:20, and the calcium is released slowly upon exposure to water.

Another embodiment provides a treatment for prolonging storage time of a harvested plant crop, comprising providing a calcium enhanced biotic fertilizer that comprises calcium mineral particles coated with organic material, wherein the calcium mineral to organic material ratio is between 20:80 and 80:20, and the calcium is released slowly upon exposure to water, and fertilizing the plant crop with at least 40, more preferably at least 200 pounds per acre of the calcium-enhanced biotic fertilizer at least 40 days prior to harvest. Preferably at least 40 pounds per acre are repeatedly applied up to 300 days before harvest.

Another embodiment provides a method of preparing a slow release calcium biotic fertilizer, comprising combining rock gypsum and manure in a mixer in the absence of an added chemical or heat to form rock gypsum particles coated with manure, adding water and acid to the coated gypsum particles to substantially convert carboxylate anions on the particle surfaces into their protonated form, and drying the coated gypsum particles at a temperature below the boiling point of water.

BRIEF DESCRIPTION OF THE DRAWINGS

FIG. 2 is a nutrient composition of a fertilizer from Example 1.

FIGS. 3a-3c show calcium dissolution rate results. S-4Gyp is sample taken before acid treatment. S-5Gyp is taken after acid treatment. Dryer Gyp is taken after dryer, and Cooler Gyp is taken after the cooling step.

FIGS. 4a and 4b graphically show dissolution rates.

DETAILED DESCRIPTION OF THE INVENTION

In studies using a kinetic mixer, it was discovered that forming gypsum particles and manure particles simultaneously at low temperatures led to an improved product of desirable calcium release and other properties. This process was quick, lower cost and yielded greater quality product compared to other processes. In particular, it was unexpectedly found that gypsum calcium treated this way formed fertilizer of unusually long release times, which can benefit control of calcium application in agriculture.

Embodiments of this surprising discovery cover new calcium and sulfur release fertilizer methods, new fertilizing techniques for supply of elevated calcium, and new, highly desirable fertilizer compositions.

Methods of Making High Calcium, Slow Release Fertilizer

Figure 1:
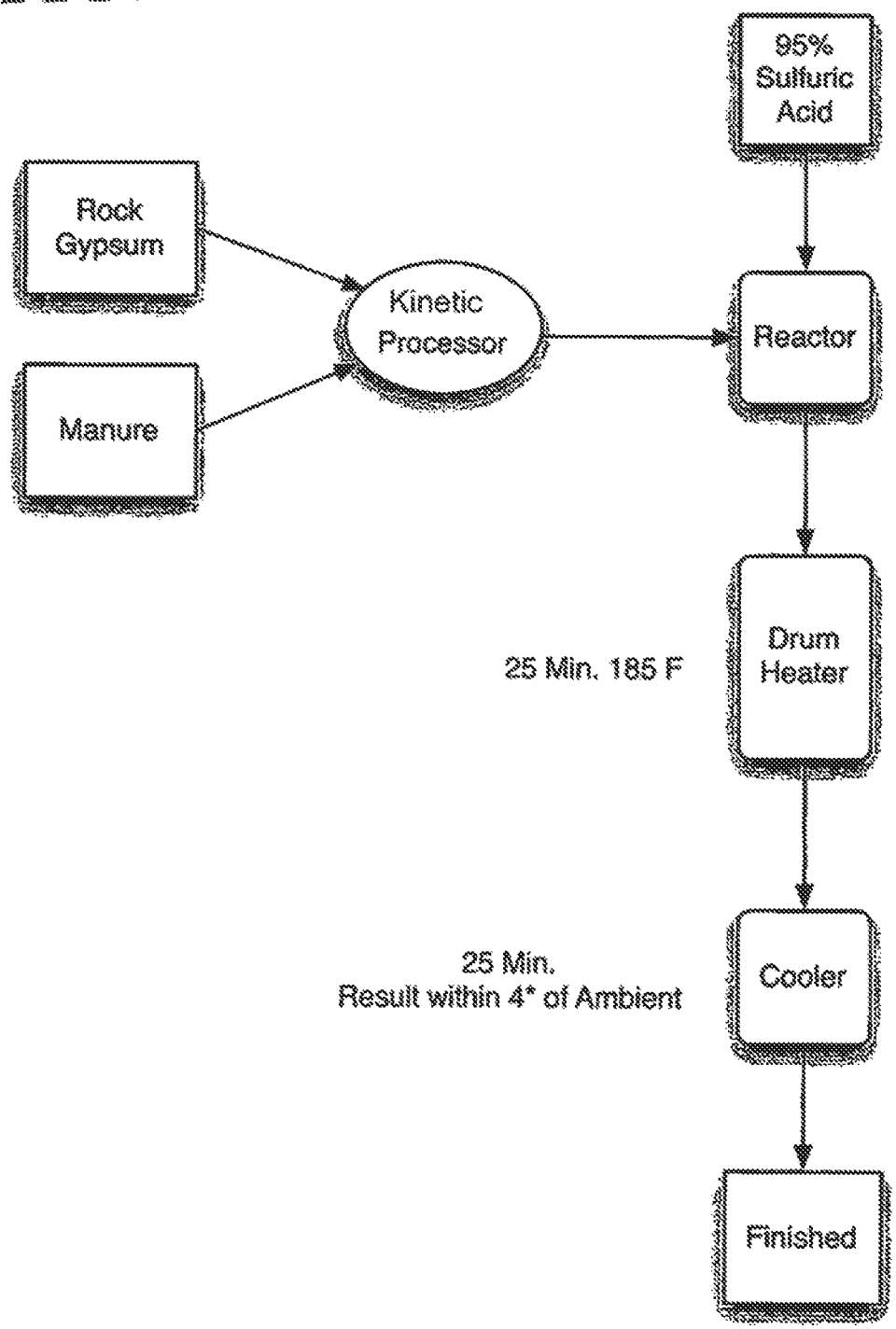
FIG. 1 is a schematic overview of a process described herein.
Figure 3C:
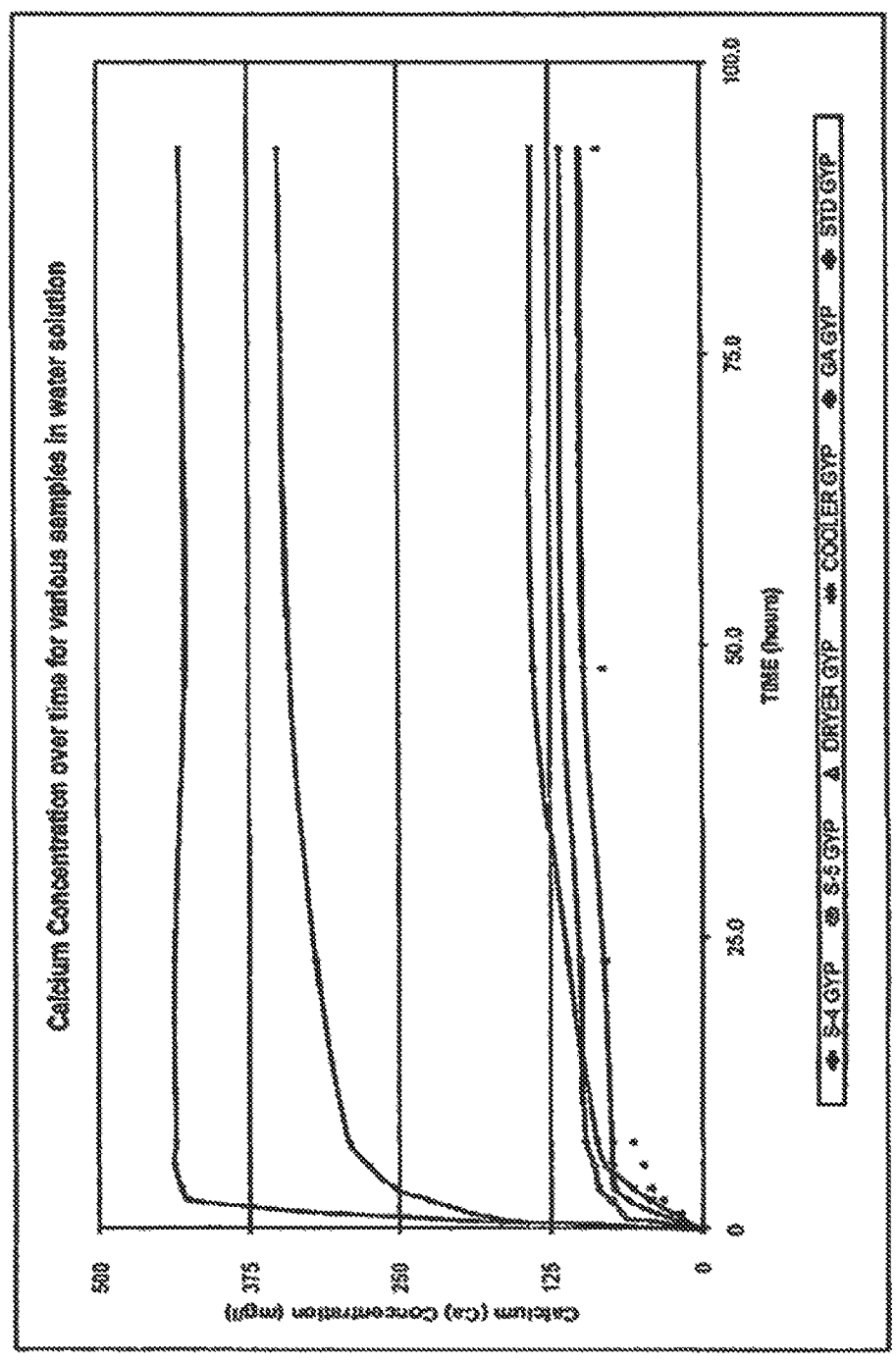
Figure 4B:
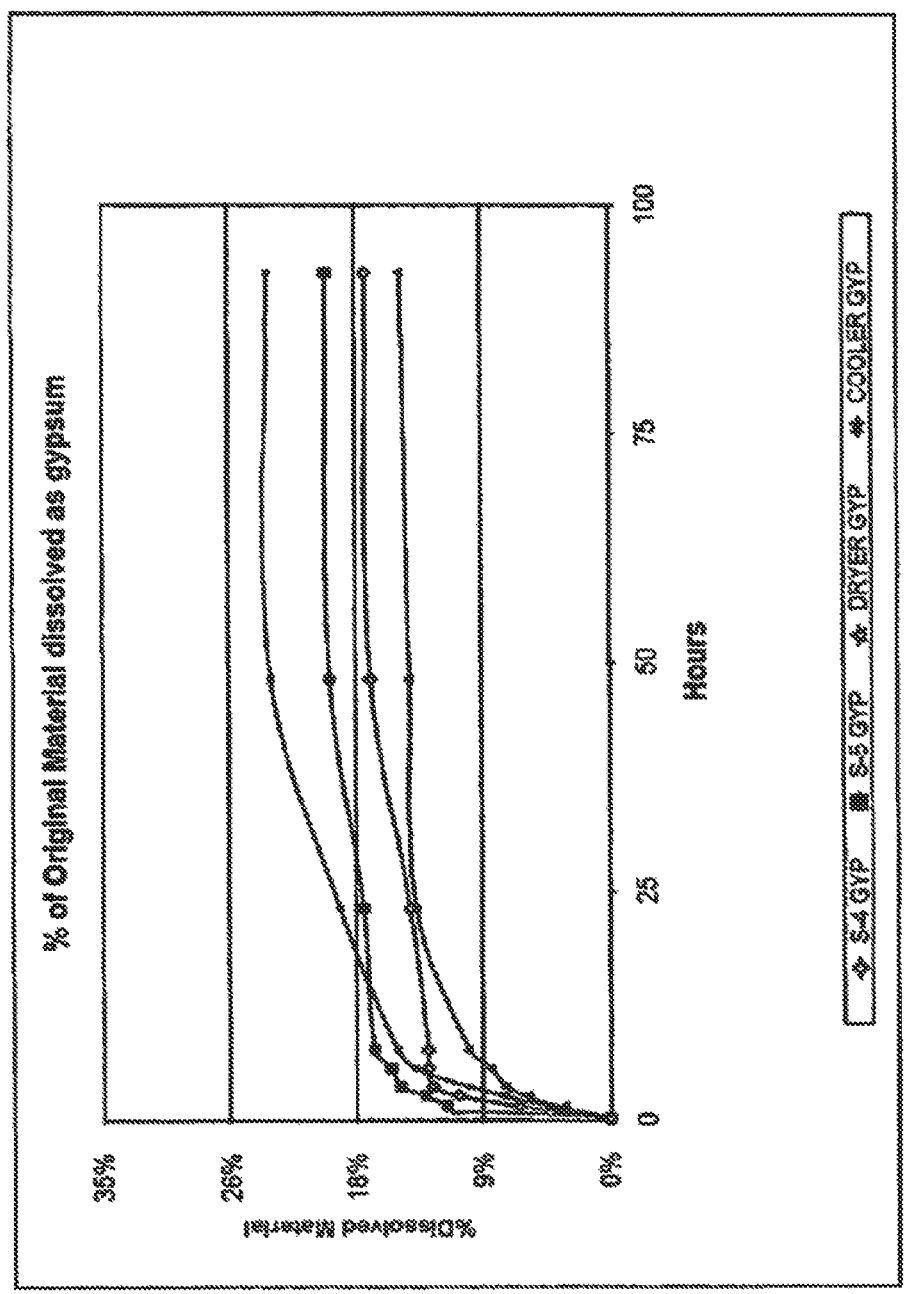

FIG. 1 depicts an overall outline for making fertilizer according to a desirable embodiment. Overall, a calcium mineral is supplied as or formed into a powder and mixed with organic humus containing manure in the absence of high temperature or an added reactive chemical such as acid or base. Mixing preferably occurs for less than 5 minutes and more preferably less than one minute. After forming of manure coated or manure bound particles, an acid is used to help break up or prevent formation of clumps. Acid addition typically heats the product by about 20 to 55 and more preferably between 30 to 40 degrees Fahrenheit. Mixing at this temperature for 1 to 15 minutes and more preferably 4-8 minutes is followed by a drying step, preferably at a temperature between 120 to 210 degree Fahrenheit, more preferably between 150 to 200 degrees and yet more preferably between 175 and 195 degrees. After this drying step, the material is cooled and packed or further processed into fertilizer. Trace elements can be added anytime and typically the product is pelletized after heating and then packaged for use.

"Rock gypsum" can be of any type as is well known, but also can be replaced, in some embodiments with other mineral forms of calcium such as lime, calcium carbonate, or even a solid chemical form such as calcium chloride crystals or calcium nitride crystals. Manure is added to this calcium material before, during or after formation of particles of the "rock gypsum" as shown here. The manure is any animal product with a high concentration of humic substances such as carboxylated polymers such as protein, nucleic acid and carbohydrate. In a desirable embodiment chicken manure having 10 to 35% water is mixed with rock gypsum in a kinetic processor in near equal amounts (wgt/wgt between 20:80 and 80:20 ratio, preferably between 40:60 ratio and 50:50 ratio). The kinetic processor forms particles at low temperature of typically less than 150 degrees Fahrenheit, particularly less than 110 degrees Fahrenheit, and more desirably less than 100 degrees Fahrenheit. Preferably a kinetic processor such as that described by U.S. 20090188290 (Inventor John Marler) is used. The procedures and materials and definitions of terms described in that patent application are particularly incorporated by reference.

Most desirably, the calcium mineral or salt, in solid form, is coated by relatively denatured manure wherein humic substances, including macromolecules that have not been degraded or precipitated by excessive heat or chemical denaturants bind to the surfaces. In an embodiment, it is important that the mineral (or solid salt) and the manure or other humic material does not exceed a temperature that produces coagulation, precipitation or denaturation of the manure or other humic material, to ensure good binding with the mineral (or salt). In an embodiment, the temperature does not exceed 200, 175, 150, 100 or even 75 degrees Fahrenheit before the two materials have had a chance to bind each other. This low temperature bind step in an embodiment is followed by a fixing step such as high temperature, acid treatment, or both to denature organic material after the organic material binds to the inorganic particle.

High Calcium, Slow Release Fertilizers: Inorganic Calcium bound to Organic Humus Advantageous fertilizers prepared by methods contemplated and described herein combine a high concentration of a calcium complex with a humic material. The calcium complex typically is selected from the group consisting of gypsum, lime, calcium carbonate, calcium chloride, calcium nitrate and other calcium minerals and salts. Preferably this inorganic material is in the form of a solid that becomes processed into particles before or during binding reaction with the organic material.

Desirably, the calcium mineral (or salt) is combined between 35% to 60% (wgt/wgt) with the organic material and more desirably is at least 40% by weight of the final fertilizer weight (excluding contribution of water to weight).

Desirably the calcium mineral is at a small average diameter of less than 250 microns, less than 150 microns and even less than 75 microns, for greater surface area contact with the organic material. Desirably, the material is not made by crushing followed by sieving, but instead by a kinetic mixer, without a subsequent sieving step.

The organic component may be a raw or partially purified (and preferably polyanionic) polymer such as alginate, crude seaweed extract, sulphonated algin, pectin, mucopolysaccharide, plant cell wall extract, or the like. In an embodiment, the organic material has been treated to contain more negatively carboxylic acid or sulfonic acid groups, for enhanced is binding to the mineral. Most desirably the organic "component" is really a very complex and rich mixture of compounds, many of which are high molecular weight and polyanionic. A manure such as swine waste, chicken waste, bovine waste, or even human waste may be used.

An intermediate in the manufacture of fertilizer as described herein may be a wet (30-90 percent water) mixture of mineral and organic materials. At some point the mixture is dried to below 40% moisture, preferably below 35% moisture and more preferably below 30% moisture. During or after moisture reduction, a drying or chemical step changes (improves) the attachment of organic material to the inorganic material. This change can be measured using the procedures described in FIG. 2, which describes analytical test results for dissolution rates for gypsum products versus gypsum-manure co-products prepared as described herein.

A preferred ratio of inorganic material to organic material in the final product is 50:50 plus or minus a 10% deviation from this (40:60 to 60:40 wgt/wgt ratio of inorganic calcium mineral or salt to organic material). Of course, a variety of other nutrients can be added to the inorganic—organic complex and can for example constitute up to 1%, 2% 5% or even more of the dry weight of the final product. Preferably less than 1% of added micronutrients or macronutrients are added, however.

Fish Material

Formulations as described herein optionally are further improved by addition of fish material. "Fish material" may consist of whole fish (undesirable leftover or spoiled fish for example), or fish parts such as scales, heads, tails, eviscerated innards, etc. By weight, desirable fish formulation ratios in this context may be for example, 2-10% fish to 20-40% gypsum with the balance manure and balancing nutrients. More desirably fish formulation ratios are 5% fish to 25-30% gypsum with the balance manure and balancing nutrients. In an embodiment, a desirable ratio is 2-10% fish to 20-40% phosphorus with the balance manure and balancing nutrients. Yet more preferably is a ratio of 5% fish waste to 25-35% phosphorus with the balance manure and balancing nutrients. Such novel phosphorus fertilizers, like the biotic gypsum formulations, offer enhanced biological nutrient integration due to the chelated values of the integrated products. The addition of chelated and reacted fish nutrients act to accelerate integration speeds, in an embodiment.

Yet another embodiment is a "Biotic Phosphate Formulation" consisting of 50% Perfect Blend™ 442 and 50% rock phosphate reacted entirely. The combination of a biotic fertilizer and rock phosphate into a uniform reacted product renders phosphate much more available than just the organic rock phosphate in its raw form. Rock Phosphate or phosphorite has a mineral phosphorous content of 15-20%, however, due to the nature of this form of phosphorous its content as a plant nutrient generally is unavailable at 3%. Processing of this mineral into our modern day phosphate products is done throughout the chemical industry. However, applicants unique processing enables an organic form of phosphorous to become usable and available.

The creation of a biotic fertilizer that contains a high level of chelated phosphate increases bio-availability of the phosphorus due to increased focused nutrition for soil microorganisms provided by the biotic fertilizer. This increased level of bio-reactivity acts to accelerate populations of soil microorganisms and results in an increase in natural soil fertility, according to embodiments.

Example 1

A high calcium fertilizer was prepared as described in FIG. 1. Large pieces (typically 1 to 12 inch diameter) of rock gypsum were added with chicken manure at a 50 to 50 ratio to a kinetic mixer, where, in the absence of an added chemical, both were kinetically smashed down to particle sizes within one minute and without denaturative heating. The mixture was then introduced to a paddle mixer reactor where water was added to make up 34% water content and then 95% sulfuric acid added at a rate of 63 pounds per 4000 lbas of the chicken/gypsum mixture. The subsequent heat increased the mixture temperature by 30-40 degrees Fahrenheit for 6 minutes. Then the mixture was introduced into a drum heater and heated to 185 degrees F. for 25 minutes to dry. The material then was brought down to within 4 degrees of room temperature by a 25 minute cooling step. Material was sampled as "S-4 Gyp" (product from kinetic mixer before acid treatment), "S-5 Gyp" (product from acid reactor), "Dryer Gyp" (after drum heater) and "Cooler Gyp" (product obtained after cooling). These samples were later compared with ACS grade calcium sulfate and also with GA gypsum material.

FIGS. 3a-3c and 4a-4b show much higher and rapid solubility of calcium from "GA Gyp" (a standard calcium sulfate product from Green Acres used in agriculture), of which 32% dissolved within 1.3 hours, 50% dissolved within 7.5 hours and 59% dissolved within 92.5 hours. In contrast, the percent dissolved calcium values for the material (half gypsum, half chicken manure) prepared for example 1 before acid treatment was 6%, 13%, and 17 percent, respectively. The percent dissolved calcium values for the material prepared for example 1 after acid treatment was 11%, 15% and 20% respectively. Coating with manure unexpectedly decreased (slowed) calcium dissolution dramatically, and this surprising effect persisted throughout all stages of fertilizer manufacture. FIGS. 3a-3c and 4a-4b show more details for fertilizer samples obtained during manufacture as described in Example 1.

Although not reported here, in an embodiment, sulfur solubility similarly is inhibited by the manure to mineral ratio mixing. In an embodiment sulfur in the gypsum dissolves less than half as fast over 1.3 hour period compared to ACS grade calcium sulfate. In another embodiment, the sulfur dissolves 25% less over the 1.3 hour period in water.

In yet another embodiment, complexation of manure with gypsum slows the release of phosphate by at least 25%, at least 35%, at least 50% and even in some cases, at least twice (100%) compared to plain manure suspended in water. An unexpected result, particularly with chicken waste, was the protection of agricultural land from rapid phosphate leaching into run off water from chicken waste fertilizers by complexing with gypsum. For this purpose, a high gypsum to chicken waste ratio (wgt/wgt assuming 25% moisture in the waste) of at least 20%, 25%, 35%, 40% or even 50% is particularly helpful and contemplated.

Other embodiments and combinations of embodiments will be appreciated by a skilled artisan upon reading the specification and are intended to be within the scope of the claims. All cited documents are incorporated by reference in their entireties.

We claim:

1. A method of preparing a slow release calcium biotic fertilizer, comprising:
   combining rock gypsum and manure in a mixer in the absence of an added chemical or heat to form rock gypsum particles coated with manure;
   adding water and acid to the coated gypsum particles to substantially convert carboxylate anions on the particle surfaces into their protonated form; and
   drying the coated gypsum particles at a temperature below the boiling point of water.

2. The method of claim 1, wherein the rock gypsum and manure are combined in a kinetic processor.

3. The method of claim 2, wherein the rock gypsum is pulverized in the kinetic mixer during the step of combining the calcium mineral with manure.

4. The method of claim 1, wherein the manure is chicken manure.

5. The method of claim 1, wherein acid is added to a final ratio of between 20 pounds and 200 pounds of 95% sulfuric acid per 4000 pounds of manure and the manure has a water content of between 10 and 30 percent.

6. The method of claim 1, wherein the drying step for drying the coated gypsum particles heats the particles to about 175-190 degrees Fahrenheit for about 15 to 35 minutes.

* * * * *